Apr. 17, 1923.
H. M. HARRIS
1,451,770
BULL AND CALF WHEEL
Filed Aug. 31, 1921
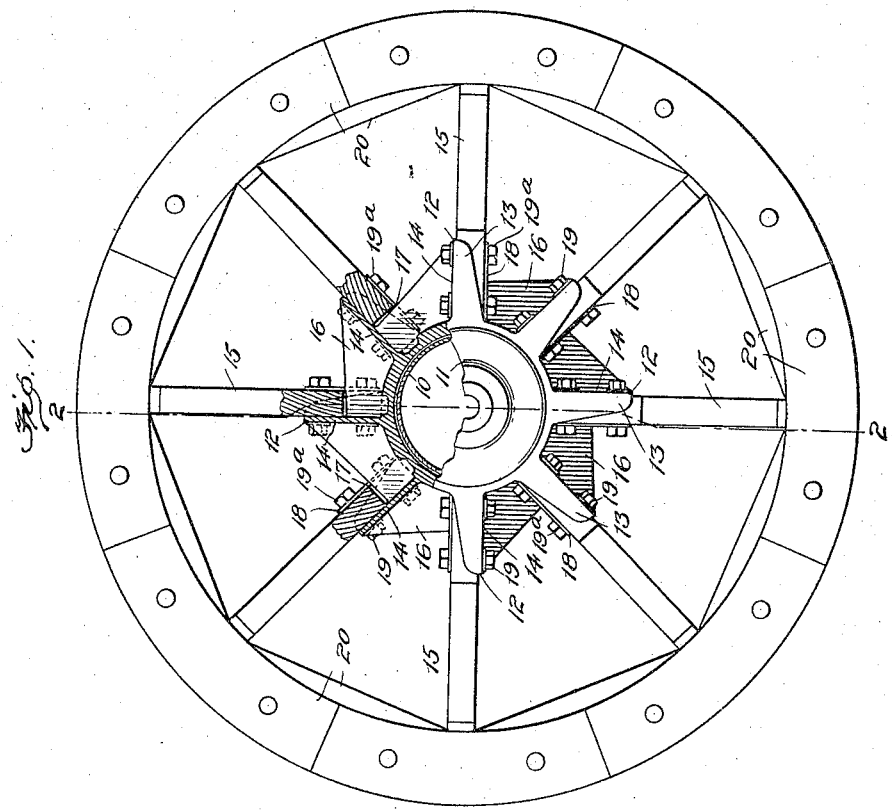
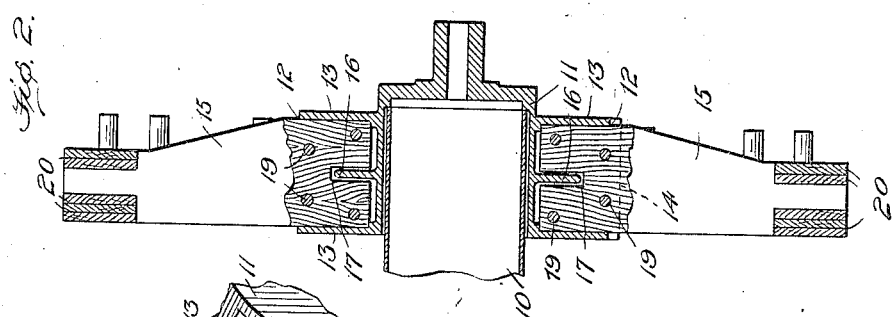
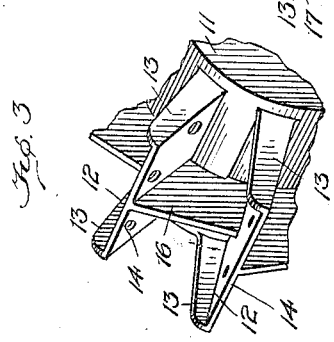

Patented Apr. 17, 1923.

1,451,770

UNITED STATES PATENT OFFICE.

HU MARVIN HARRIS, OF CHATTANOOGA, TENNESSEE, ASSIGNOR TO LUCEY MANUFACTURING CORPORATION, OF NEW YORK, N. Y., A CORPORATION OF TENNESSEE.

BULL AND CALF WHEEL.

Application filed August 31, 1921. Serial No. 497,172.

*To all whom it may concern:*

Be it known that I, HU MARVIN HARRIS, a citizen of the United States, residing at Chattanooga, in the county of Hamilton and State of Tennessee, have invented certain new and useful Improvements in Bull and Calf Wheels; and I do hereby declare the following to be a full, clear, and exact description of the same, reference being had to the accompanying drawings, forming part of this specification.

This invention relates to oil well rigging and more particularly to those elements of such apparatus commonly known in the art as the bull and calf wheels.

To aid in assembling the wheel and to facilitate the production of the cants used in constructing the wheels, the present invention has for one of its objects to provide a bull or calf wheel with the spokes thereof arranged radially of the hub or shaft on which the wheel is mounted, this differing from the wheels now generally used in that in the latter the spokes are arranged tangentially to the shaft or hub, thereby necessitating the ends of the cants being cut off on odd angles that are difficult to lay out.

A further object is to provide a hub for wheels of the types mentioned that is formed with means for strengthening the hub and sockets thereof and for aiding in maintaining the spokes in their proper positions transversely of the hub. These strengthening and spoke positioning means preferably consist of a series of radially disposed, circumferentially extending webs, each socket having a web formed therein adapted to project into a suitable recess in the end of the spoke adjacent the hub.

A further object is to provide the hub with the sockets and webs without interfering with the tightening up of the spokes in their sockets should they become loose, as they sometimes do, due to shrinkage in hot weather.

In the accompanying drawings,—

Figure 1 is a side view of a bull wheel, partly in section, embodying the present invention;

Fig. 2 is a sectional view on the line 2—2, Fig. 1, and

Fig. 3 is a perspective view of a portion of the wheel hub.

Referring to the drawings, the bull wheel shaft 10 is of any desired construction. Although the present invention is applicable to calf wheels as well as to bull wheels, only a portion of shaft 10 is illustrated with the bull wheel mounted thereon, it being deemed unnecessary to illustrate the entire shaft and calf wheel as the construction of the latter, in so far as the present invention is concerned, is identical with that of the bull wheel.

The annular hub 11 of the wheel is suitably secured on shaft 10 and has a plurality of spoke sockets 12 formed on its periphery, the walls of said sockets projecting radially of the hub. Each socket 12 comprises side walls 13 formed flush with the edges of the hub 11 and a rear wall 14 that extends transversely of the hub and connects the side walls 13. The other side of each socket opposite the transverse wall 14 is open, permitting the spokes 15 to be easily assembled in the sockets and as the sockets are arranged radially of the hub the last spoke to be put in its socket may be placed therein with the same facility as the first spoke. The side and center cants 20, forming the periphery of the wheel are secured to the outer ends of spokes 15 in any desired manner.

Each spoke 15 is rigidly secured in its socket by a plurality of bolts 19, preferably four, or any other equivalent fastening means, that extend through the spoke and rear or transverse wall 14 of the socket, the spoke being drawn up tight against the wall 14. To aid in maintaining the spokes in position transversely of the wheel and also to strengthen the rear or transverse walls 14 of the sockets, as these walls are placed under the greatest strain, each socket is provided with a reinforcing web 16 that preferably extends circumferentially of the hub and at right angles to said walls 14 and is located centrally of the side walls 13.

Where the open side of one socket 12 faces the transverse wall of the next adjacent socket, as in the present instance, each web 16 preferably extends from the inner face of wall 14 of one socket past the open side of said socket and merges into the outer face of the transverse wall of the next socket. It may, however, be found advantageous to arrange the sockets in different relations and the webs need not necessarily be formed in the exact manner just described and the present invention is not to be considered as limited to that exact construction unless the same is called for by the claims hereof.

The inner or hub end of each spoke 15 is slotted as at 17 to accommodate the webs 16 in the sockets and the webs not only extend at right angles to the walls 14, but said webs are also tapered towards the inner faces of said walls so as not to interfere with the movement of the spokes when they are being tightened, the spokes sometimes becoming loose in the sockets due to shrinkage in hot weather. To protect the outer faces of the spokes a metal plate 18 is interposed between the spokes and the nuts 19ª on the bolts 19.

The present construction wherein the spokes 12 are arranged radially of the hub has two great advantages over wheels with spokes arranged tangentially to the shaft, i. e., it is much easier to put the last spoke in place when assembling the wheel and the cants do not have to have their ends cut on angles that are difficult to lay out.

What is claimed is:

1. In wheels of the types described, the combination of a hub, a series of radially disposed sockets formed on said hub, a radially disposed web formed on said hub and positioned intermediate the side walls of each of said sockets, and spokes secured in said sockets, said spokes extending radially from the hub and each having a preformed recess at its inner end for the reception of said web.

2. In wheels of the types described, the combination of a hub, a series of radially disposed sockets spaced circumferentially of the hub, a radially disposed web extending from one wall of each socket to a point within the next adjacent socket, and radially disposed spokes secured in each of said sockets.

3. In wheels of the types described, the combination of a hub, a plurality of sockets spaced circumferentially of the hub, each socket having an open side and a wall opposite said open side extending transversely of the hub, a series of webs formed on the hub, each web extending from the transversely extending wall of one socket into the next adjacent socket, and radially disposed spokes secured in said sockets.

4. In wheels of the types described, the combination of a hub, a plurality of radially disposed sockets formed on the hub, each socket having an open side and a wall opposite said open side extending transversely of the hub, a radial web formed on said hub within each of the sockets extending circumferentially of the hub, radially disposed spokes seated in said sockets, each of said spokes having a recess in its inner end for reception of the web in the socket, and means for securing the spokes to the transverse walls of the sockets, each of said webs being tapered whereby spokes becoming loose in the sockets may be drawn against the transverse walls of the sockets.

5. A hub for wheels of the types described comprising a plurality of radially disposed sockets each having an open side and a radially disposed web in each of said sockets, said webs being spaced from the side walls of the sockets and extending at right angles to the open sides of the sockets.

6. A hub for wheels of the types described comprising a series of radially disposed sockets spaced circumferentially of the hub, each socket having an open side and a wall opposite said open side extending transversely of the hub, and circumferentially extending webs in said sockets, each web extending from the inner face of the transverse wall of one socket to the outer face of said wall of the next adjacent socket.

HU MARVIN HARRIS.